US010619664B2

(12) United States Patent
Colligan

(10) Patent No.: US 10,619,664 B2
(45) Date of Patent: Apr. 14, 2020

(54) QUIET DOOR LATCH

(71) Applicant: Francis Colligan, New Haven, CT (US)

(72) Inventor: Francis Colligan, New Haven, CT (US)

(73) Assignee: Accurate Lock & Hardware Co. LLC, Stamford, CT (US)

( * ) Notice: Subject to any disclaimer, the term of this patent is extended or adjusted under 35 U.S.C. 154(b) by 344 days.

(21) Appl. No.: 15/467,277

(22) Filed: Mar. 23, 2017

(65) Prior Publication Data

US 2017/0275918 A1 Sep. 28, 2017

Related U.S. Application Data

(60) Provisional application No. 62/311,980, filed on Mar. 23, 2016.

(51) Int. Cl.

| | |
|---|---|
| ***F16B 45/02*** | (2006.01) |
| ***E05B 17/00*** | (2006.01) |
| ***E05B 15/10*** | (2006.01) |
| *E05C 1/16* | (2006.01) |

(52) U.S. Cl.

CPC ............ *F16B 45/02* (2013.01); *E05B 15/102* (2013.01); *E05B 17/0041* (2013.01); *E05B 17/0045* (2013.01); *E05B 2015/107* (2013.01); *E05C 1/16* (2013.01); *Y10T 24/45319* (2015.01)

(58) Field of Classification Search

CPC ........... Y10T 70/5226; Y10T 292/0982; Y10T 292/0836; Y10T 292/0971; Y10T 292/0834; Y10T 292/096; Y10T 292/0969; Y10T 292/097; Y10T 292/098; Y10T 292/0985; Y10T 292/0994; Y10T 292/1098; Y10T 292/558; Y10T 292/0824; Y10T 292/11

See application file for complete search history.

(56) References Cited

U.S. PATENT DOCUMENTS

| | | | | |
|---|---|---|---|---|
| 2,445,119 A * | 7/1948 | Ledin | E05C 19/04 292/33 |
| 2,869,913 A | 1/1959 | Schlage | |
| 3,561,803 A * | 2/1971 | Schlage | E05B 63/22 292/143 |
| 4,677,834 A * | 7/1987 | Hicks | E05B 47/0002 292/144 |
| 6,212,923 B1 | 4/2001 | Clark | |
| 6,622,535 B2 * | 9/2003 | Chiang | E05B 47/0692 292/DIG. 27 |
| 7,258,374 B2 | 8/2007 | Rusiana | |

(Continued)

FOREIGN PATENT DOCUMENTS

| | | |
|---|---|---|
| CN | 2612766 Y | 4/2004 |
| CN | 102644412 A | 8/2012 |

(Continued)

*Primary Examiner* — Mark A Williams

(74) *Attorney, Agent, or Firm* — Forge IP, PLLC

(57) ABSTRACT

A door latch mechanism including a latch housing, a bolt having a proximal end with a head and a distal end having a latch, a hub including a central bore for receiving a spindle, a lever actuated by rotation of the hub, the lever including a slot in a top portion of the lever receiving the head of the bolt such that the lever and the bolt move together in both rearward and forward directions.

18 Claims, 7 Drawing Sheets

(56) References Cited

U.S. PATENT DOCUMENTS

| | | | | |
|---|---|---|---|---|
| 7,510,222 | B2 | 3/2009 | Hodgin et al. | |
| 2003/0127864 | A1* | 7/2003 | Dalsing | E05B 55/06 292/169.14 |
| 2014/0319850 | A1* | 10/2014 | Berger | E05C 19/163 292/177 |

FOREIGN PATENT DOCUMENTS

| | | | |
|---|---|---|---|
| CN | 103726716 | A | 4/2014 |
| CN | 203654921 | U | 6/2014 |
| CN | 204112873 | U | 1/2015 |
| CN | 204252654 | U | 4/2015 |
| CN | 204571510 | U | 8/2015 |
| CN | 204609542 | U | 9/2015 |
| CN | 105089370 | A | 11/2015 |
| CN | 204920508 | U | 12/2015 |
| DE | 29801345 | U1 | 6/1999 |
| JP | 2011052526 | A | 3/2011 |

* cited by examiner

QUIET DOOR LATCH

FIELD OF THE INVENTION

The present invention relates to door lock mechanisms, and more specifically to mortise style door lock mechanisms with noise reduction features.

BACKGROUND OF THE INVENTION

Mortise door locks are known in the art and typically include a locking mechanism that is set within the body of a door in a recess or mortise, as opposed to one attached to the door surface. Mortise door locks typically include the combination of a latch, operated by a door knob or lever, and a separate deadbolt mechanism. Some mortise door locks omit the deadbolt mechanism.

Mortise door locks are often used in institutional environments, such as hospitals. Hospitals tend to be busy and loud with many people coming and going from patients rooms at all hours. This makes it difficult for patients to sleep or rest comfortably. Thus, it is desired to reduce noise in hospitals, and one way to do so is by quieting the door lock mechanisms.

It is therefore desired to provide a door lock mechanism, such as a mortise door lock, that achieves a lower noise threshold.

SUMMARY OF THE INVENTION

Accordingly, it is an object of the present invention to provide a door lock with additional features to reduce noise.

These and other objectives are achieved by providing a door latch mechanism including a latch housing, a bolt having a proximal end with a head and a distal end having a latch, a hub including a central bore for receiving a spindle, a lever actuated by rotation of the hub, the lever including a slot in a top portion of the lever receiving the head of the bolt such that the lever and the bolt move together in both rearward and forward directions. Further provided is a door or door assembly system including such a door latch mechanism.

The bolt may be slideably mounted in a mount fixed to an interior surface of the latch housing. In some embodiments, there is a first spring around the bolt between the head and the mount and a second spring around the bolt between the mount and the latch. The spring rates may be different from one another. For example, the spring rate of the second spring is greater than the spring rate of the first spring in some embodiments.

In some embodiments, the latch housing includes a rear wall and a front wall, at least one of the rear wall and the front wall including a dampening pad. In some embodiments, the latch mechanism further includes a box mountable within a doorjamb, the box including a magnet positioned adjacent to a distal end of the latch.

The latch may be a three-piece latch with an upper portion, a lower portion, and a center portion where the center portion is the first portion to contact the doorjamb. The center portion may be, for example, a roller element that indexes upon contact between the roller element and the door jam. In some embodiments, the upper and lower portions are metal and the central portion is polymer.

Other objects of the invention and its particular features and advantages will become more apparent from consideration of the following drawings and accompanying detailed description.

DETAILED DESCRIPTION OF THE INVENTION

Figure 1:
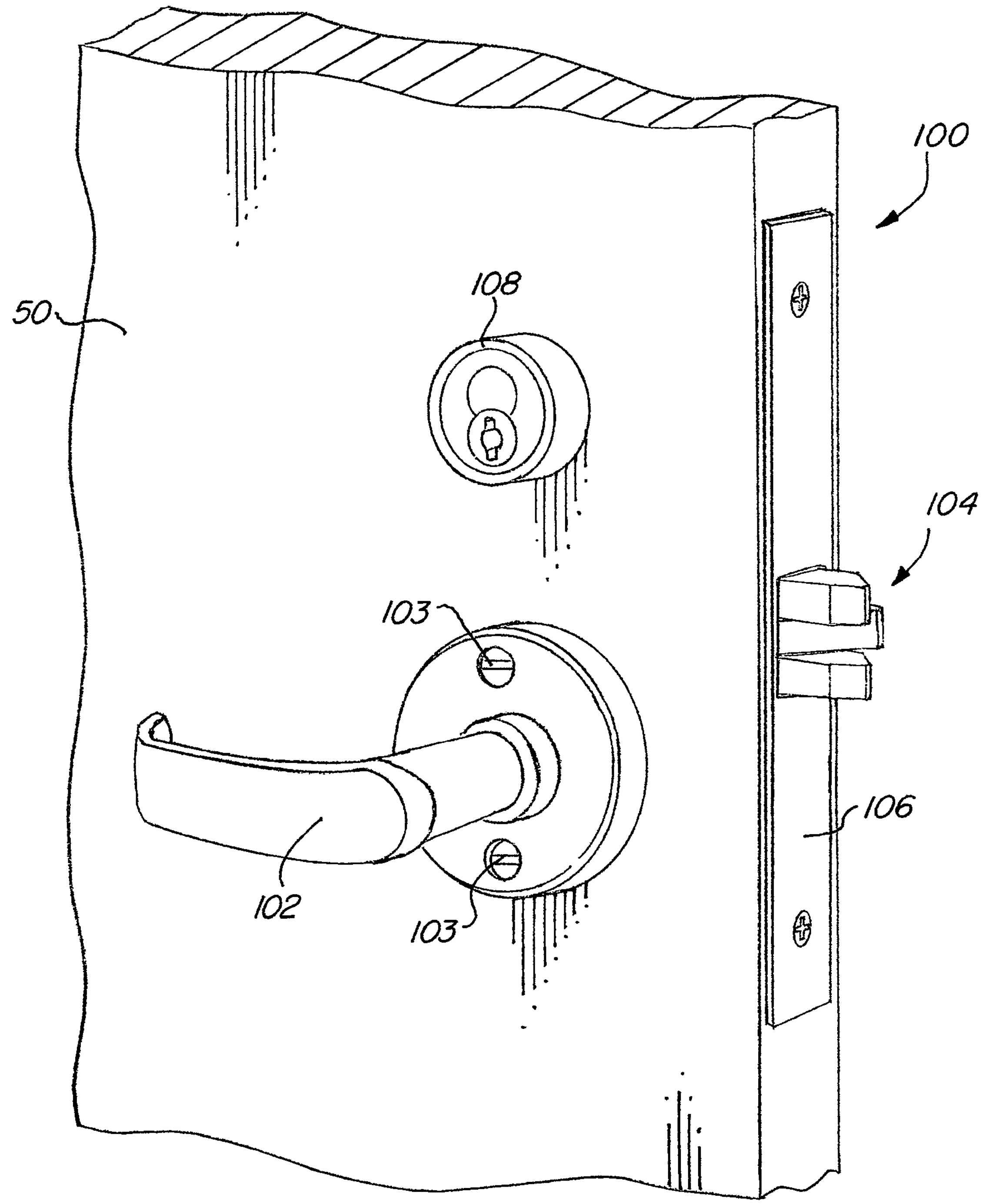
FIG. 1 shows a door including a door latch assembly according to an exemplary embodiment of the present invention.

FIG. 1 illustrates a door latch assembly 100 according to the present invention installed in a swinging architectural door 50. The latch assembly 100 includes a handle 102, a latch 104 (or latch bolt), and an edge mounting plate 106. In some embodiments, the latch assembly 100 also includes a lock 108.

Figure 2:
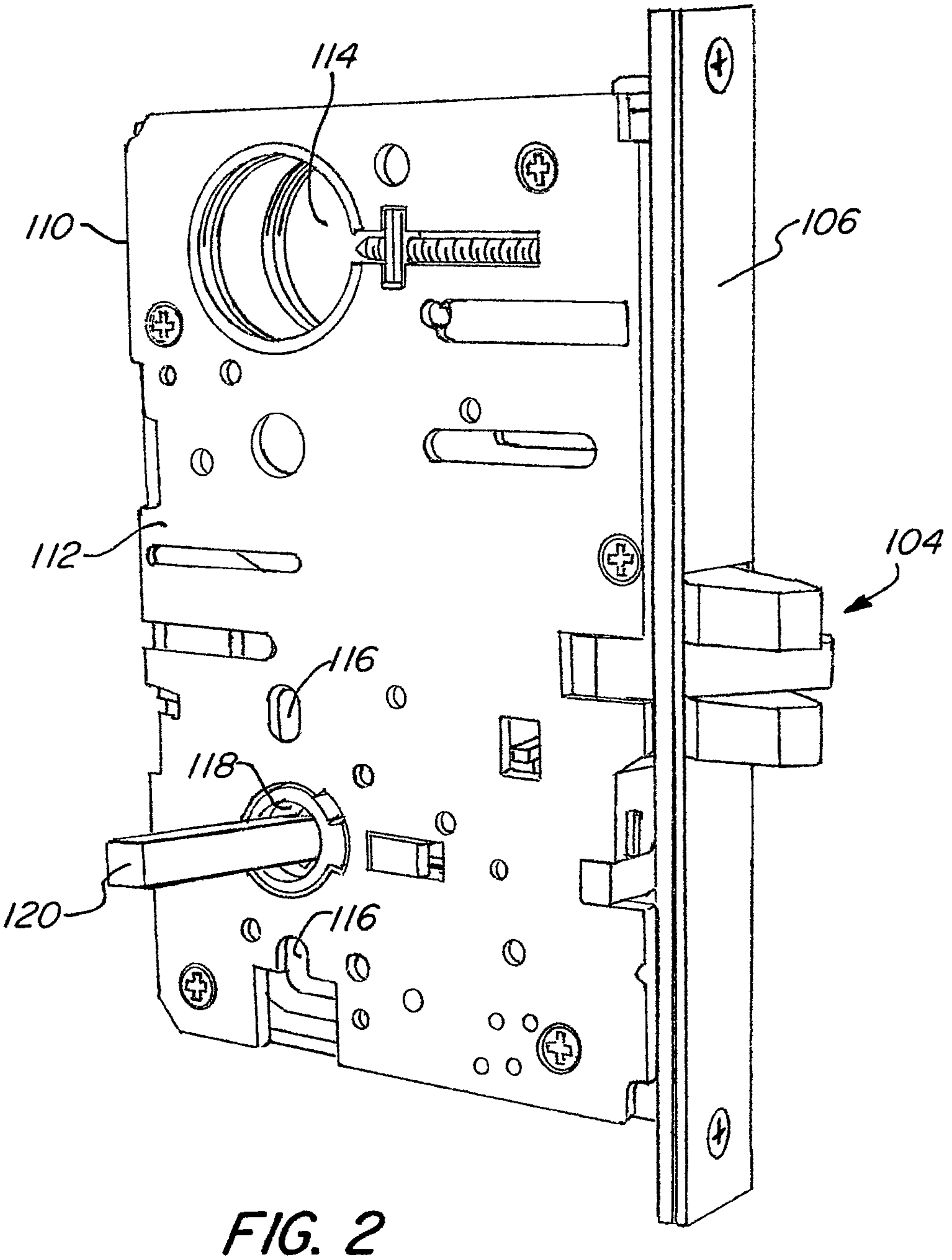
FIG. 2 is a perspective view of the door latch assembly.

FIG. 2 is a perspective view of the door latch assembly 100 removed from the door 50. The latch assembly 100 includes housing 110 with at least one side panel 112 and a rear panel 113. The housing 110 has an opening 114 for receiving the optional lock 108. The housing 110 also has holes 116, through the side panel 112, for receiving screws or bolts 103 when mounting the door handle 102 to the housing 110.

The door latch assembly 100 includes an opening 118 for receiving a spindle 120 of the door handle 102 which extends at least partially through the housing 110. The spindle 120 typically has a non-circular cross-section, such as square, to engage within the opening 118 and operate the door latch assembly 100 by rotation. In some embodiments, there is an opening 118 and a spindle 120 on each of the two sides of the housing 110 operating independent of one another.

Figure 3:
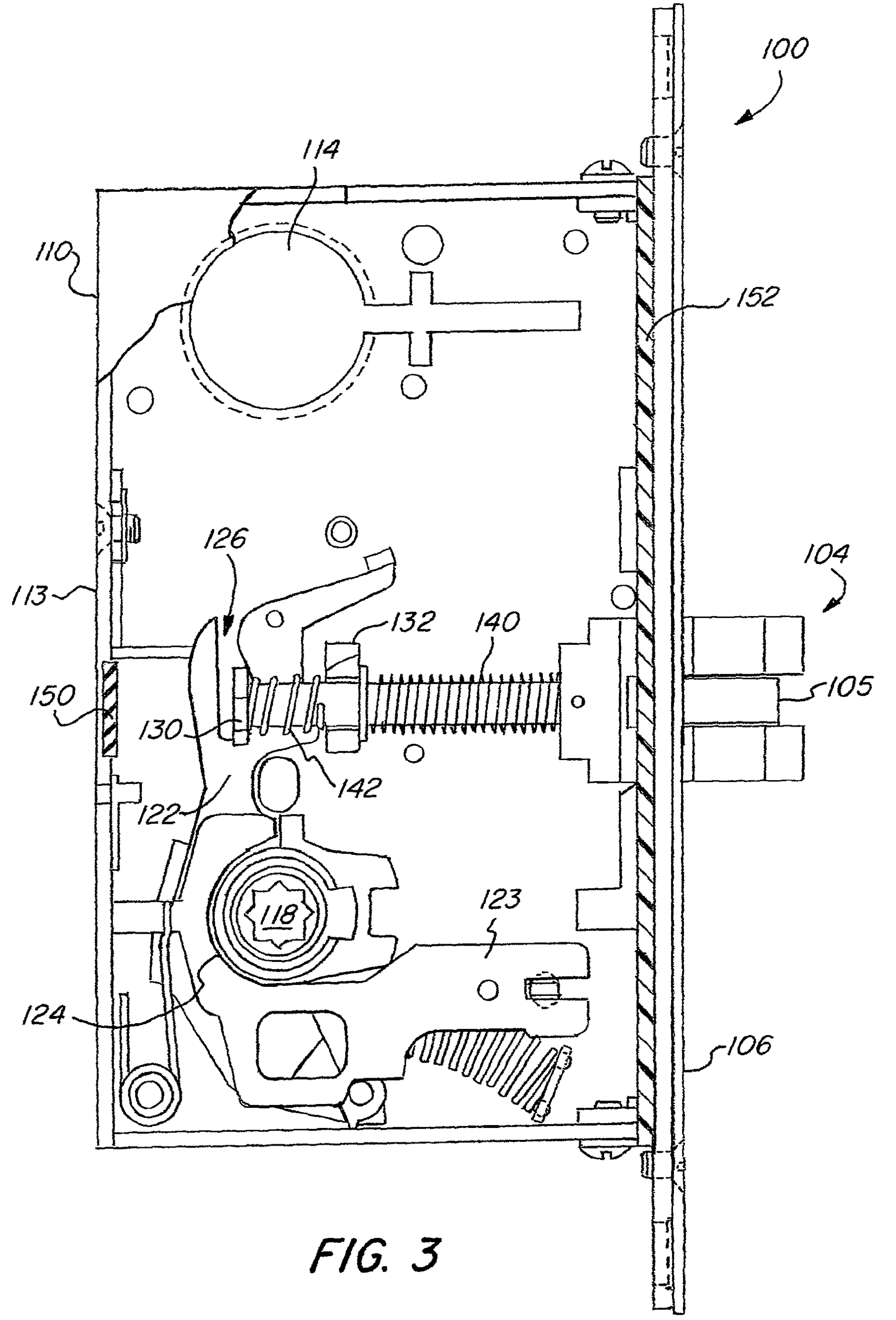
FIG. 3 is a cutaway view of the door latch assembly.

FIG. 3 is a cutaway view of the door latch assembly 100. Inside the housing 110, the latch assembly 100 includes a retractor assembly 123 with a lever 122 that pivots about a retractor hub 124 housed within the retractor assembly 123. The lever 122 is actuated by rotation of the spindle 120 which extends through the opening 118 in the hub 124 and is connected to the handle 102. The hub 124 acts against the lever 122 to move the bolt 130 and advance and return the latch 104. The bolt 130 is guided by a mount 132 secured to an internal surface of one of the side panels 112.

In a typical design of an entrance lock mechanism, such as a mortise style lock, there is significant noise during actuation. In particular, when the handle 102 or knob is released, the parts slam back into position causing noise. Opening and closing a door having a typical lock mechanism generally results in noise in the range of 95 db. The present invention significantly reduces this noise.

The lever 122 includes a slot 126 that receives a head of the bolt 130. By pairing the hub lever 122 to the head of the bolt 130, they move together in both directions to slow the entire mechanism down and thus reduce noise. The slot 126 also prevents the head of the bolt 130 from hitting the back of the housing 110.

There is a first spring 140 around a distal end of the bolt 130 which acts between the bolt mount 132 and a rear portion of the latch 104. The first spring 140 returns the latch 104 to its original outward position after actuation.

In the present invention, there is also a second spring 142 around a proximal end of the bolt 130. The second spring 142 preferably has a lower stiffness or spring rate than the first spring 140. The second spring 142 acts to slow the return of the bolt 130 after actuation. The second spring 142 also prevents the head of the bolt 130 from impacting the mount 132.

In some embodiments, the present invention includes a soft (e.g., foam) pad 150 fixed to rear panel 113 of the housing 110 to avoid any noise in the event that the lever 122 impacts the housing 110. Another foam pad or gasket 152 is added between the housing 110 and the edge mounting plate 106 providing sound-proofing to capture or dampen any internal noise, keeping it in the case.

In the present embodiment, the latch 104 is a split latch including an upper portion, a center portion 105, and a lower portion. The center portion extends beyond the upper and lower portions in a direction of the door jam and is at least partially rotatable. Thus, when the door 50 closes, the center portion 105 is the first portion to contact the door jam or striking plate. Upon contacting the door jam or striking plate, the center portion 105 rotates in an opposite direction to be in line with the upper and lower portions, after which all three portions recess together into the door latch assembly 100.

The upper and lower portions of the latch 104 are generally made out of metal. The center portion 105 of the latch 104, or the anti-friction element, is made out of a polymer to avoid and/or reduce noise due to the latch hitting the strike as the door closes. In some embodiments, the center portion 105 is comprised of Delrin (acetal homopolymer).

Opening and closing a door having the lock mechanism according to the present invention generally results in noise in the range of 55-60 db, a significant reduction over the typical design. In some embodiments, the noise is further reduced by the hub lever 122 being rigidly connected to, or formed as a single piece with, the hub 124 and/or the retractor assembly 123 to control the return speed of the levers and or knobs.

Figure 4:
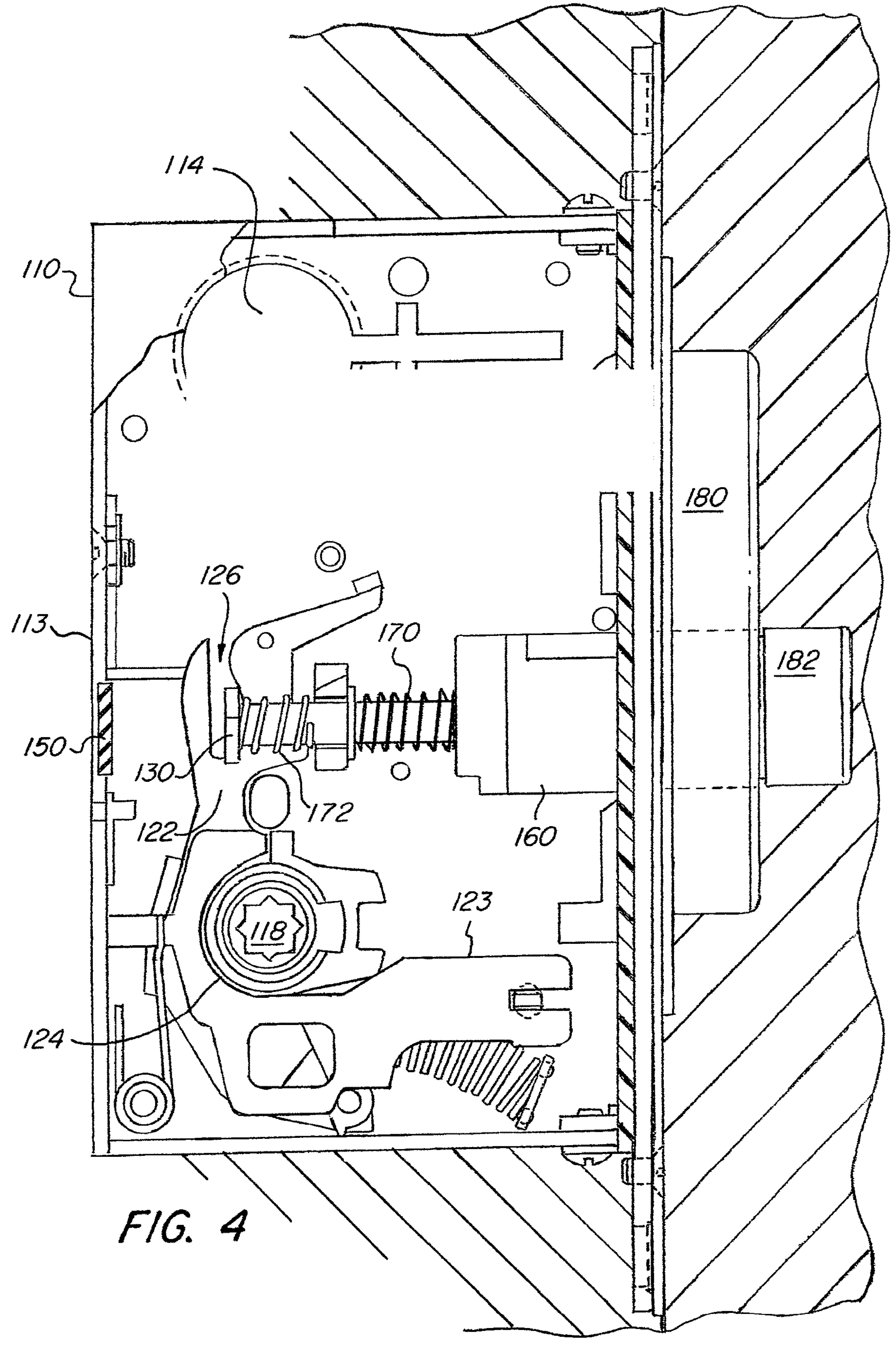
FIG. 4 is a cutaway view of the door latch assembly including a magnetic locking mechanism.

FIG. 4 is another cutaway view of the door latch assembly 100. In this embodiment, the latch 104 is replaced with a deadbolt 160. The door jam adjacent to the latch assembly 100 includes a box 180 for receiving the deadbolt 160. The box 180 has a magnet 182 attached to the box, e.g., by a center rivet or screw. When the door 50 is closed, the magnet 182 pulls the deadbolt 160 out of the latch assembly 100 causing the door to automatically lock. Actuation of the retractor 123 and/or handle 102 allows the door to be unlocked and opened.

In the embodiment of FIG. 4, there is a first spring 170 around a distal end of the bolt 130 and a second spring 172 around a proximal end of the bolt 130. Unlike the embodiment of FIG. 3, the second spring 172 preferably has a higher stiffness or spring rate than the first spring 170 in order to bias the deadbolt 160 inward rather than outward.

Figure 5:
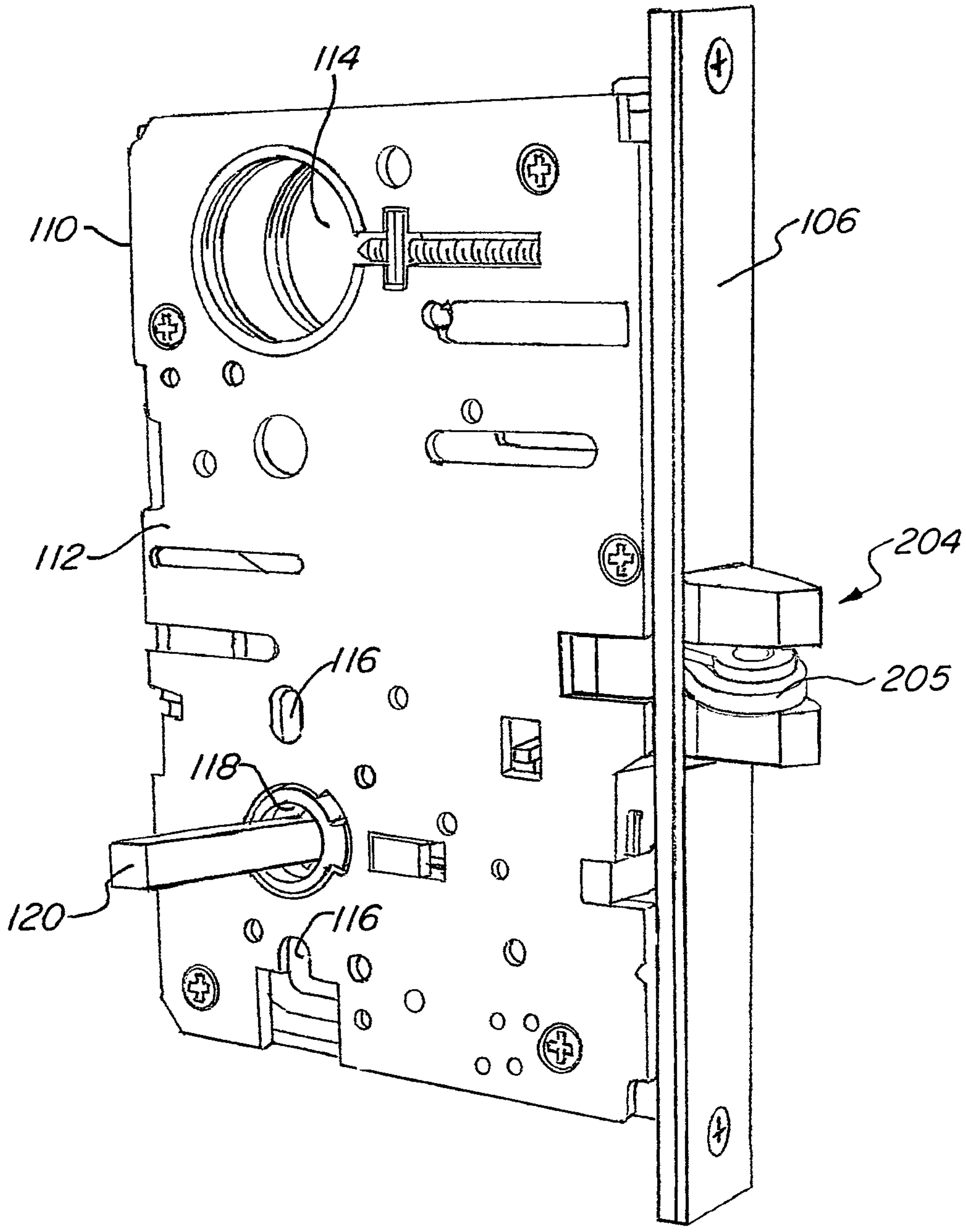
FIG. 5 is another perspective view of the door latch assembly.
Figure 6:
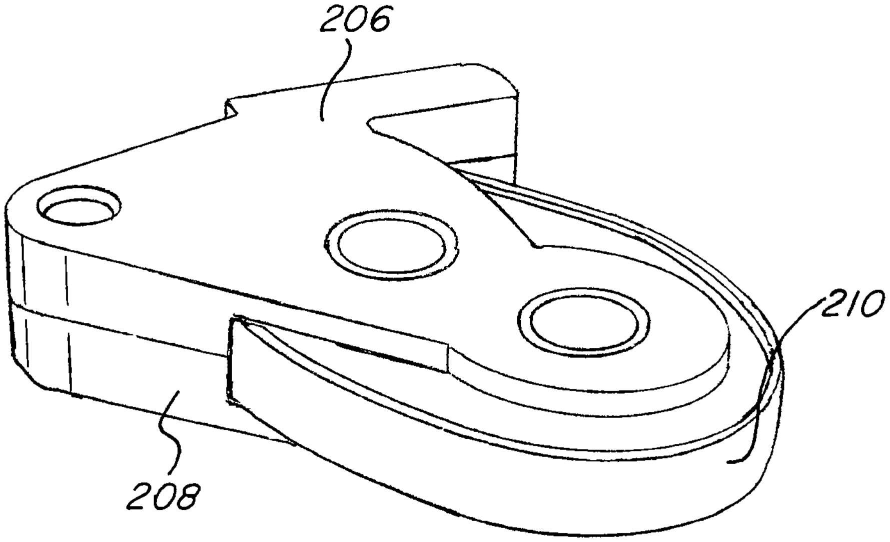
FIG. 6 is a perspective view of an anti-friction element of the latch assembly shown in FIG. 5.
Figure 7:
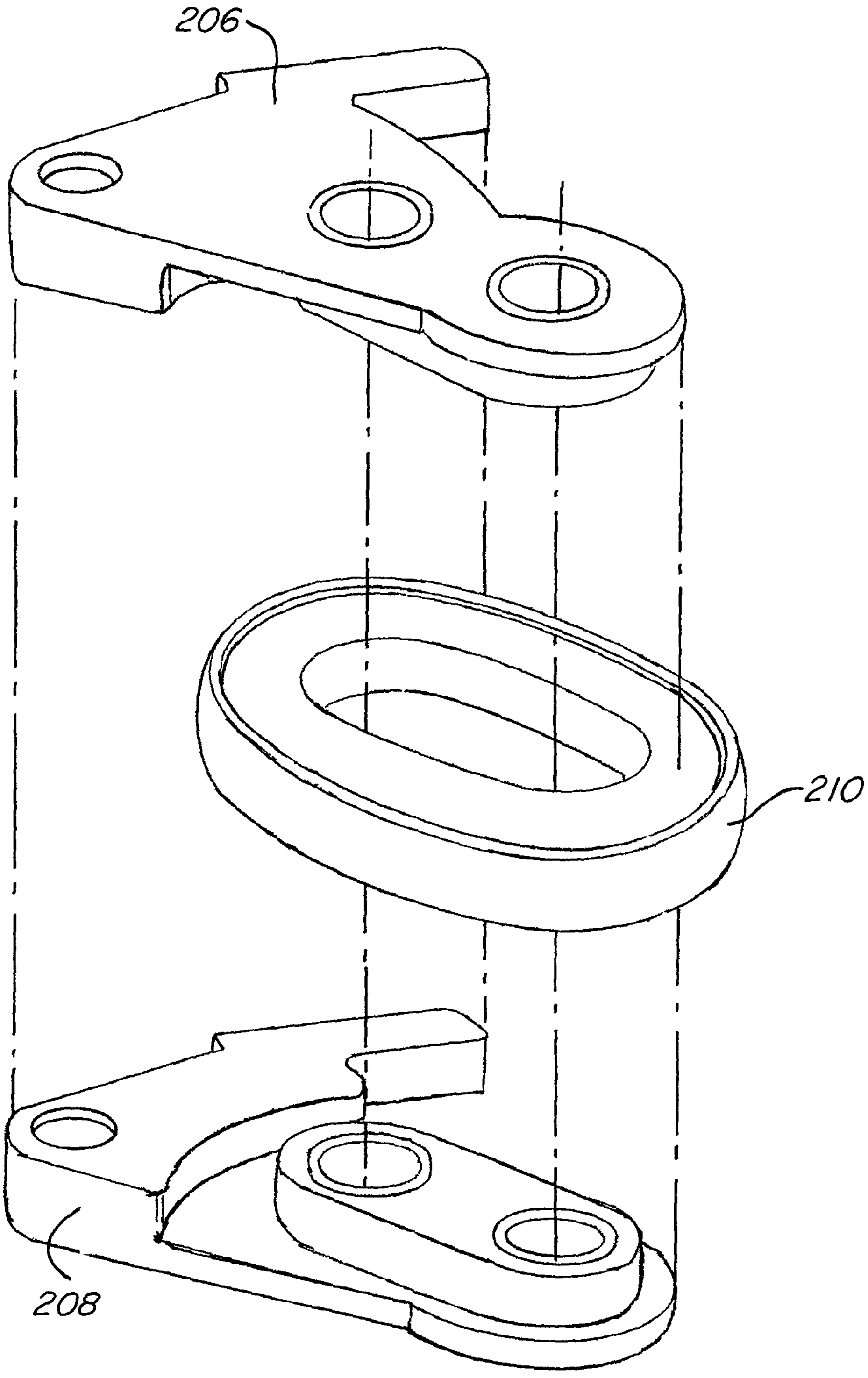
FIG. 7 is an exploded view of the anti-friction element shown in FIG. 6.

FIGS. 5-7 illustrate the door latch assembly 100 including an alternate latch 204. The latch 204 includes a center element 205 having a roller 210. The roller 210 is capable of rolling or indexing when it contacts the door jam or strike plate. The roller 210 may be, for example, a soft (e.g., rubber) wheel. In some embodiments, the roller 210 includes a series of treads about the circumference of the roller 210 to ensure indexing. As shown in FIGS. 6-7, the center element 205 may be comprised of an upper portion 206, a lower portion 208, and the roller 210. At least one or both of the upper and lower portions 206/210 includes a track for receiving the roller 210.

Although the invention has been described with reference to a particular arrangement of parts, features and the like, these are not intended to exhaust all possible arrangements or features, and indeed many modifications and variations will be ascertainable to those of skill in the art.

What is claimed is:

1. A door latch mechanism, comprising:

a latch housing;

a bolt having a longitudinal axis, a proximal end with a head and a distal end having a latch;

a hub including a central bore for receiving a spindle;

said bolt being moveable from an outward position, wherein the latch extends from said latch housing, to an actuated position, wherein the latch is retracted into said latch housing, upon rotation of said hub; and a lever actuated by rotation of said hub, said lever including a slot in a top portion of said lever, said slot being generally perpendicular to the longitudinal axis of said bolt and being configured for receiving the head of said bolt such that rotation of said hub is translated to axial displacement of said bolt by way of cooperation of the slot in said lever and the head of said bolt, and wherein the head of said bolt is captured within the slot in said lever such that said lever and said bolt are paired and always move together both when the bolt moves from the outward position to the actuated position and from the actuated position to the outward position.

2. The door latch mechanism according to claim 1, wherein said bolt is slideably mounted in a mount fixed to an interior surface of said latch housing.

3. The door latch mechanism according to claim 2, further comprising a first spring around said bolt between the head and the mount, the first spring biasing the latch of said bolt toward the outward position, and a second spring around said bolt between the mount and the latch, the second spring damping movement of said bolt when said bolt moves from the actuated position to the outward position.

4. The door latch mechanism according to claim 3, wherein the first spring has a spring different from a spring rate of the second spring, such that a bias created by the first spring overcomes an opposing bias created by the second spring.

5. The door latch mechanism according to claim 1, wherein said latch housing includes a rear wall and a front wall, at least one of the rear wall and the front wall including a dampening pad which dampens an impact of an element into at least one of the rear wall and the front wall.

6. The door latch mechanism according to claim 5, wherein said pad is fixed to the rear wall of said latch housing adjacent to the top portion of said lever.

7. The door latch mechanism according to claim 5, wherein said pad spans an entirety of the front wall of said latch housing.

8. The door latch mechanism according to claim 1, further comprising:

a box mountable within a doorjamb, said box including a magnet positioned adjacent to a distal end of the latch, said magnet acting on the latch to bias the latch toward the outward position.

9. The door latch mechanism according to claim 1, wherein the latch includes a roller element that indexes upon contact between the roller element and a door jam.

10. The door latch mechanism according to claim 1, wherein the latch includes an upper portion, a lower portion, and a center portion.

11. The door latch mechanism according to claim 10, wherein the upper and lower portions are metal and the central portion is polymer.

12. The door latch mechanism according to claim 10, wherein the central portion includes a rotatable roller that indexes upon contact between the roller element and a door jam.

13. A door latch mechanism, comprising:

a latch housing, said latch housing including a rear wall and a front wall;

a bolt having a longitudinal axis, a proximal end with a head and a distal end attached to a latch, said bolt slideably mounted in a mount on an interior surface of said latch housing;

a hub including a central bore for receiving a spindle;

said bolt being moveable from an outward position, wherein the latch extends from said latch housing, to an actuated position, wherein the latch is retracted into said latch housing, upon rotation of said hub;

a lever actuated by rotation of said hub, said lever including a slot in a top portion of said lever, said slot being generally perpendicular to the longitudinal axis of said bolt and being configured for receiving the head of said bolt such that rotation of said hub is translated to axial displacement of said bolt by way of cooperation of the slot in said lever and the head of said bolt, and wherein the head of said bolt is captured within the slot in said lever such that said lever and said bolt are paired and always move together both when the bolt moves from the outward position to the actuated position and from the actuated position to the outward position;

a first dampening pad positioned on the rear wall adjacent to the top portion of said lever which dampens an impact of an element into the rear wall; and a second dampening pad along the front wall of said latch housing which dampens an impact of an element into the front wall.

14. The door latch mechanism according to claim 13, wherein the latch includes a roller element that indexes upon contact between the roller element and a door jam.

15. The door latch mechanism according to claim 13, wherein the latch includes an upper portion, a lower portion, and a center portion.

16. The door latch mechanism according to claim 15, wherein the upper and lower portions are metal and the central portion is polymer.

17. The door latch mechanism according to claim 13, further comprising a first spring around said bolt between the head and the mount, the first spring biasing the latch of said bolt toward the outward position, and a second spring around said bolt between the mount and the latch, the second spring damping movement of said bolt when said bolt moves from the actuated position to the outward position.

18. The door latch mechanism according to claim 17, wherein the first spring has a spring rate different from a spring rate of the second spring, such that a bias created by the first spring overcomes an opposing bias created by the second spring.

* * * * *